Patented July 5, 1949

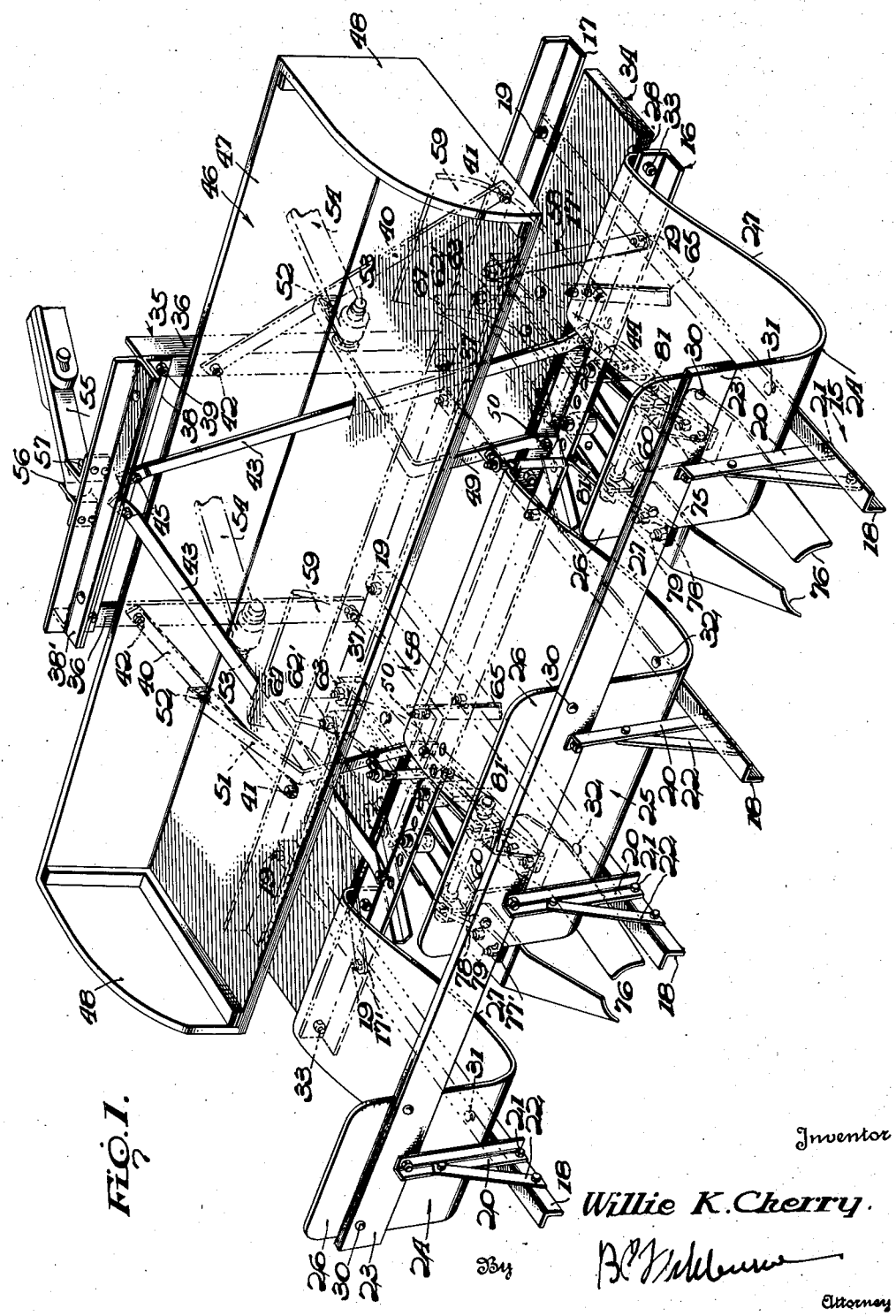

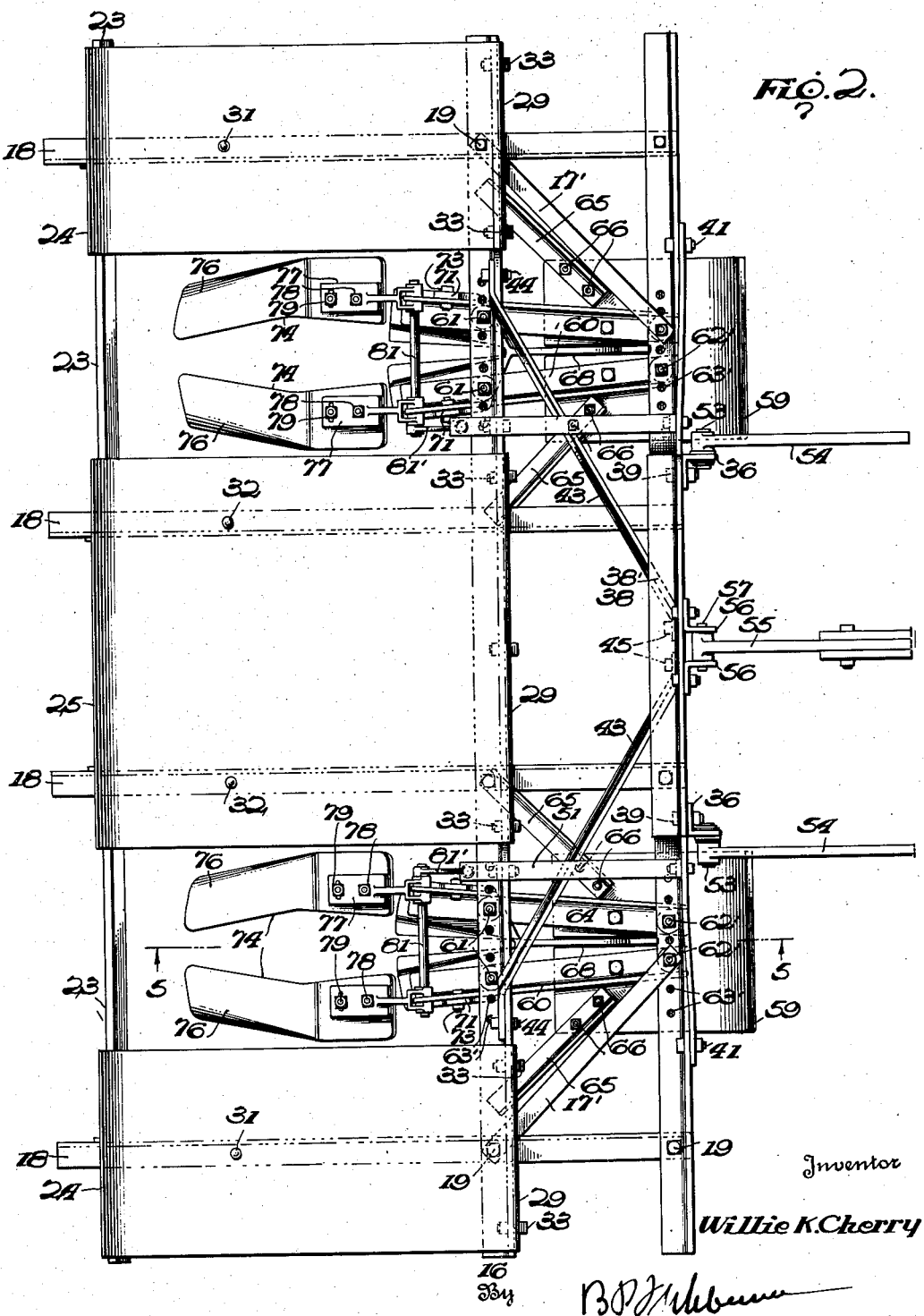

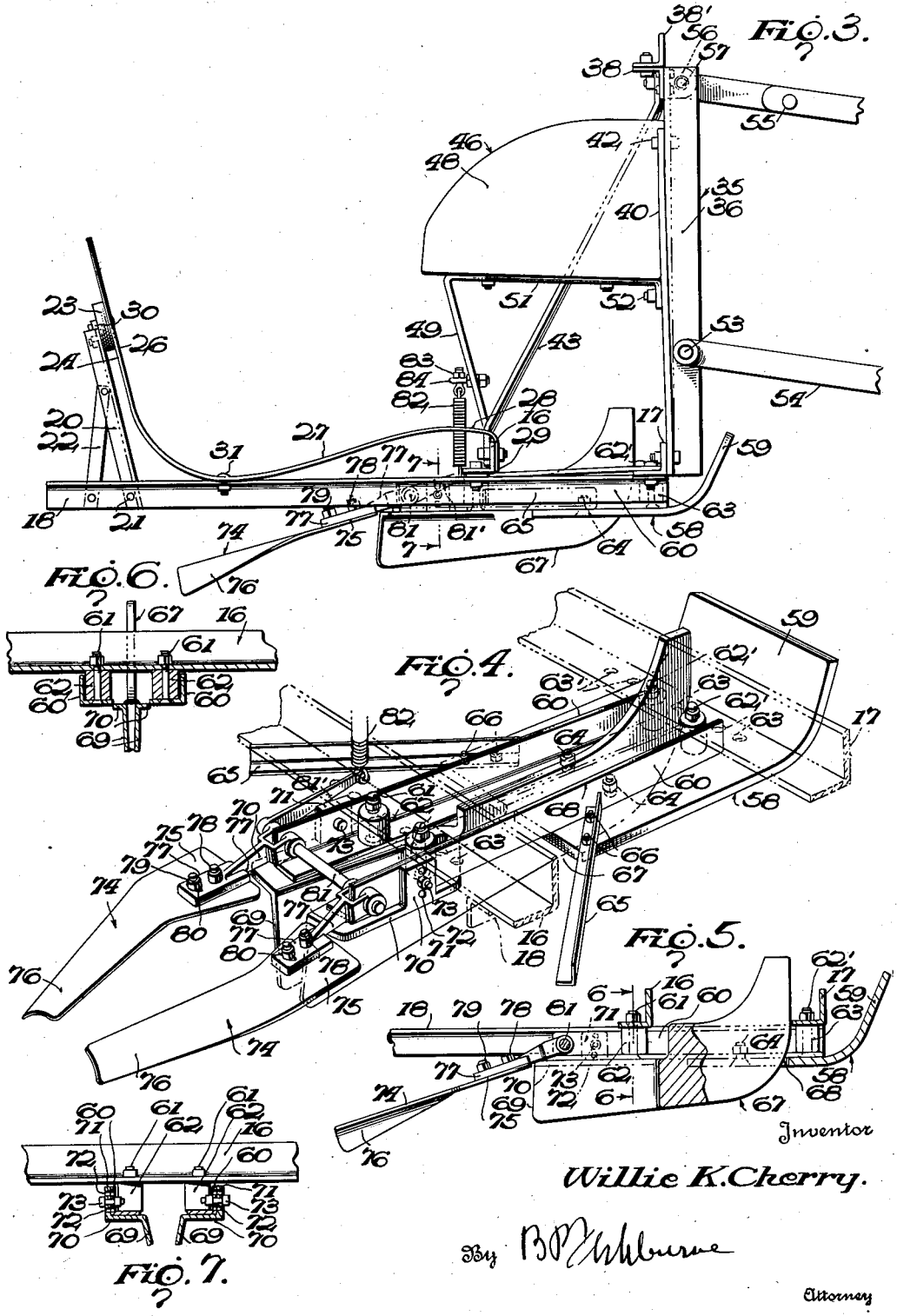

2,475,078

UNITED STATES PATENT OFFICE 2,475,078

TRANSPLANTER DRILL SET

Willie K. Cherry, Orangeburg, S. C.

Application August 7, 1945, Serial No. 609,391

3 Claims. (Cl. 111—85)

My invention relates to a plant setting machine.

An important object of the invention is to provide a plant setting machine which is mounted upon a tractor and is supported by the hydraulic lift of the tractor and raised and lowered by such lift.

A further object of the invention is to provide a machine of the above mentioned character which will bring the operator or operators sufficiently close to the ground so that the plants may be quickly manually transplanted and which will promote the convenience of the operator or operators.

A further object of the invention is to provide a machine of the above mentioned character having no wheels for supporting the same.

A further object of the invention is to provide a machine of the above mentioned character having seats so arranged that a proper number of operators may be employed for placing the plants within the furrow.

A further object of the invention is to provide a machine of the above mentioned character having means to shape, form or pack the previously formed hill, produce a furrow in the hill, and then properly cover and pack the plants which are inserted by hand in the furrow.

A further object of the invention is to provide adjustable means whereby the depth of the furrow may be regulated, in accordance with the size of the plants being transplanted.

A further object of the invention is to provide a machine of the above mentioned character having a generally horizontal frame which is maintained generally horizontal in use and when being raised and lowered.

Other objects and advantages of the invention will be apparent during the course of the following description.

In the accompanying drawings forming a part of this application and in which like numerals are employed to designate like parts throughout the same, Figure 1 is a perspective view of a transplanting machine embodying my invention, Figure 2 is a plan view of the same, Figure 3 is a side elevation of the same, Figure 4 is a perspective view of the furrow opener and associated elements, Figure 5 is a longitudinal section taken on line 5—5 of Figure 2, Figure 6 is a transverse section taken on line 6—6 of Figure 5, and Figure 7 is a transverse section taken on line 7—7 of Figure 3.

In the drawings, wherein for the purpose of illustration is shown a preferred embodiment of my invention, the machine is shown as comprising a horizontal frame 15, including transverse bars or angle-irons 16 and 17. These transverse angle-irons are rigidly connected with longitudinal bars or angle-irons 18, by bolts 19 or the like. The transverse angle-irons 16 and 17 are rigidly connected by diagonal bars or braces 17', rendering the horizontal frame stiff.

The longitudinal angle-irons 18 extend rearwardly beyond the transverse angle-iron 16 and carry uprights 20, secured thereto at 21. These uprights are preferably slightly inclined and are connected with diagonals or braces 22, also connected with the rear ends of the longitudinal angle irons 18. The uprights 20 are therefore rigidly mounted upon the angle-irons 18. The upper ends of the uprights 20 are rigidly connected with a horizontal transverse bar 23, which may be formed of wood. The numeral 24 designates outer seats and 25 an inner double seat. Each seat is preferably formed of a strip of heavy sheet metal, which is bent into the desired shape, forming a back 26 and a generally horizontal seat portion 27. The seat portion is extended to form a leg portion 28, which is bent downwardly at its forward end to provide a depending skirt 29. Each back portion 26 is rigidly attached to the bar 23 by bolts or rivets 30. The seat portions 27 of the outer seats 24 have their transverse centers arranged above the outer angle-irons 18, and these seat portions are secured to such angle-irons 18 by bolts 31 or the like. The seat portion 27 of the inner double seat 25 is arranged over the inner angle irons 18, which are disposed near and spaced from the longitudinal edges of such seat portion. This seat portion is rigidly secured to the inner angle irons 18 by bolts 32 or the like. The leg portion 28 of each seat is extended over the rear transverse angle-iron 16, and its skirt 29 is arranged in advance of the angle-iron 16 and is rigidly attached thereto by bolts or rivets 33. The longitudinal angle-irons 18, forwardly of the transverse angle-iron 16, are preferably covered by a plank or planks forming a platform 34 for supporting the feet of the operators.

Arranged at the forward end of the horizontal frame 15 and adjacent to the forward transverse angle-iron 17, is a vertical attaching frame 35, including uprights or vertical angle-irons 36, the lower ends of which are bolted to the forward transverse angle-iron 17, as shown at 37. The upper ends of the vertical angle-irons 36 are rigidly connected by a horizontal bar or angle-iron 38, by bolts 39. A second transverse angle-iron 38' is arranged above the angle-iron 38 and rigidly secured thereto. Transverse diagonal braces 40 are attached to the angle-iron 17 at 41 and to the upper portions of the angle-irons 36, at 42. The numeral 43 designates inclined braces which diverge at their lower ends and are rigidly attached to the rear transverse angle-iron 16 by bolts 44, while their upper converging ends are rigidly secured to the upper angle-iron 38, by bolts 45. The various braces render the supporting structure embodying the connected horizontal frame 15 and vertical frame 35 stiff or rigid.

The braces 43 extend through the bottom of a plant tray 46, having an upstanding front 47 and ends 48. The front 47 is attached to the vertical angle-irons 36 by the bolts 42, while the bottom of the tray is supported near its rear end by vertical bars 49, attached at their lower ends to the rear transverse angle-iron 16 by bolts 50. The upper ends of the bars 49 are bent into horizontal portions 51, having depending ends which are bolted to the diagonal braces 40, at 52.

The vertical angle-irons 36 have horizontal pivot elements or pins 53, rigidly secured thereto, and these pivot elements engage vertically swinging arms 54, included in the hydraulic lift of a tractor, such as a Ford tractor. A guide link or arm 55 is pivotally connected with knuckles 56, by means of a pin 57, and these knuckles are rigidly secured to the angle-iron 38', as shown. The arm 55 is preferably adjustable longitudinally so that its length may be varied and the selected length obtained. The arm 55 is pivotally mounted upon the tractor to swing vertically with the arms 54, and the arms 54 and 55 remain parallel, so that the frame 15 is maintained horizontal when raised or lowered. The horizontal frame 15 may be supported in close relation to the ground, but does not contact with the ground, and can be brought much closer to the ground than could be accomplished by the use of supporting wheels mounted upon the frame 15. This brings the operators close to the ground so that they can introduce the plants into the furrow with the least effort and perform the work quickly and properly.

The present machine is designed to transplant two rows of plants, although it may be built to transplant a larger number of rows of plants. I provide combined leveling and packing or blocking elements 58, formed of heavy stiff sheet metal. These elements or sheets 58 are transversely flat and their forward ends are bent upwardly, providing inclined portions 59, arranged in advance of the front transverse angle iron 17. These elements or plates 58 are arranged horizontally beneath horizontal bars or angle-irons 60, having their horizontal webs arranged lowermost and their vertical webs disposed outwardly. The angle-irons 60 are horizontal and extend longitudinally of the frame 15, and preferably converge forwardly slightly. The angle-irons 60 are rigidly secured to the rear transverse angle-iron 16 by bolts 61, Figures 5 and 7, passing through spacers 62, while the forward ends of the angle-irons 60 are rigidly secured to the front transverse angle-iron 17 by bolts 62', passing through spacers 63. The angle-irons 60 project down below the angle-irons 18 for a short distance, such as one-half inch, while the transverse angle-irons 16 and 17 are arranged at a still higher elevation, and hence cannot engage the ground. The elements or plates 58 are rigidly attached to the angle-irons 60 by bolts 64. The elements or plates 58 preferably have extensions or wings 65, rigidly secured thereto by bolts 66 or the like. These wings are preferably formed of angle-irons having their horizontal webs next to the elements or plates 58, and their vertical webs at their outer edges. The purpose of the wings 65 is to increase the sweeping width of the elements or plates 58, should the hill be wider than these elements or plates. The elements or plates 58 travel over the top of the rows or hills which have been previously cultivated or formed and are therefore more or less soft and unpacked, to level off the top of the hills and compress or pack the same to some extent. This provides the hill with a flat top.

Cooperating with each element or plate 58 is a furrow opener 67, including a blade arranged vertically upon edge and inclined upwardly toward its forward end. This blade extends through a longitudinal slot 68 in the element or plate 58, and may project above the same. The furrow opener extends downwardly below the element or plate 58 and the extent of such downward projection will define the depth of the furrow. Each furrow opener is forked at its rear end, providing rearwardly diverging wings or blades 69, carrying horizontal flanges 70 at their tops, formed integral therewith. The horizontal flanges 70 have vertical brackets 71 rigidly secured thereto and preferably formed integral therewith. These vertical brackets 71 have vertically spaced openings 72. Bolts 73 extend through selected openings 72 and clamp the brackets 71 to the angle-irons 60. Each furrow opener is therefore rigidly secured to the adjacent pair of angle-irons 60 and may be vertically adjusted with respect to the element or plate 58, to regulate the depth of the furrow. It is to be noted that the pair of angle-irons 60, element or plate 58 and the furrow opener 67 are all connected and constitute a unit, which is removable as such from the transverse angle-irons 16 and 17, by manipulation of the bolts 61 and 62'. The angle-irons 16 and 17 may have a plurality of spaced openings 63' for receiving the bolts 61 and 62', respectively, whereby the two furrow forming units may be transversely adjusted, to compensate for hills spaced different distances.

Means are provided for coaction with each furrow opener, after the plant is set in the furrow by hand, to fill in the earth about the plant and suitably pack the earth. This means comprises a pair of longitudinal shares 74, which are spaced to provide a passage between them for the plants. Each share 74 has a forward portion 75 which is generally horizontal and transversely flat, while the share is inclined downwardly toward its rear end. The share is also bent or twisted at its outer longitudinal edge, providing a depending portion 76, inclined transversely toward the hill. The depending portions 76 converge longitudinally rearwardly and move the earth inwardly to fill the furrow, while the top portions of the shares, near their rear ends, serve to compress or pack the earth about the plant, as these top portions are also inclined downwardly toward their rear ends. Each share 74 has an arm 77, Figure 4, arranged above it, at its forward end, and this arm is connected with the flat portion 75 by bolts 78 and 79, clamping these parts together. The bolt 79 passes through a segmental slot 80 formed in the arm 77, whereby the shares may be angularly adjusted, and made to converge more or less, as desired. The forward ends of the arms 77 are forked to straddle the vertical webs of the angle-irons 60 and these forked ends are rigidly mounted upon a rock shaft 81, journalled in openings formed in the vertical webs. The arms 77 are therefore pivotally mounted upon the angle-irons 60 to swing vertically. A lever 81' is connected with each rock shaft 81 and this lever extends forwardly and upwardly and is connected with a retractile coil spring 82, extending upwardly and having a swiveled connection with an adjusting screw 83, engaging a bracket 84, rigidly mounted upon the bar 49, as more clearly shown in Figure 3.

The machine may be particularly advantageously employed in transplanting sweet potatoes, although it may be used to transplant other plants, such as celery, tomatoes, tobacco, strawberries or the like.

The operation of the machine is as follows:

The horizontal frame 15 is brought to the proper lowered elevation, by manipulation of the arms 54 of the hydraulic lift of the tractor. This horizontal frame 15 should clear the ground and may be arranged at an elevation of about two inches above the ground, although this elevation may be varied. One operator sits in each of the end seats 24, while two operators sit in the inner double seat 25. Two operators are provided for each hill and are arranged near and upon opposite sides of the hill. The machine is bodily supported by the arms 54 and 55 and transported by the tractor, which is driven slowly down the rows, so that the hills occur beneath the space between the outer seats and the inner double seat. The hills have been previously cultivated and thrown up and are in a more or less loose or soft condition. The combined leveling or packing element or plate 58 travels over the hill and levels and packs the same, providing a flat top. The furrow opener 67 follows the element or plate 58 and produces a furrow. This furrow may be from two to five inches deep, although this depth may be varied, and the furrow may be about two inches in width, although this may be varied. The plants, such as sweet potato slips, are arranged upon the plant tray 46 and the two operators for each row take the plants from the tray and insert them in the furrow, as formed, spacing the same about six to ten inches apart, although this may be varied. After the slips or plants are placed in the furrow, the shares 74 follow the furrow opener, moving the earth inwardly, to fill the furrow about the plants, and at the same time, compressing or packing the earth about the plants. The spring 82 yieldingly forces the shares 74 downwardly. If desired, the shares 74 may be individually pivoted, and a separate spring employed to force each share downwardly.

When turning around or transporting the machine, the frame 15 is raised about 18 inches and supported in the elevated position. An advantage of my machine is that the horizontal frame 15 needs no ground engaging wheels to support the same, rendering it easy to make short turns and for transporting the same, and also rendering it possible to bring the frame close to the ground.

It is to be understood that the form of my invention herewith shown and described is to be taken as a preferred example of the same, and that various changes in the shape, size and arrangement of parts may be resorted to without departing from the spirit of my invention or the scope of the subjoined claims.

Having thus described my invention, what I claim is:

1. A transplanting machine to be moved longitudinally of a hill, comprising a frame, a pair of longitudinally extending spaced bars arranged beneath the frame, means for detachably securing the bars to the frame, a scraping plate arranged beneath the bars and attached thereto and having its forward end extending upwardly and having a longitudinal slot, a furrow opener including a blade extending into the slot and provided at its rear end with spaced wings, said wings having substantially horizontal flanges, brackets rigidly attached to the flanges, adjustable means for securing the brackets to the bars at selected elevations, furrow covering shares extending rearwardly beyond the wings and pivotally mounted upon the bars, yielding means to move the shares downwardly, the bars, plate, furrow opener and shares being removable as a unit from the frame.

2. A transplanting machine to be moved longitudinally of a hill, comprising a frame, a pair of longitudinally extending bars arranged in spaced relation and secured to the frame, a scraping plate arranged beneath the bars and attached thereto and having its forward end extending upwardly and having a longitudinal slot, a furrow opener including a blade extending into the slot and provided at its rear end with spaced wings, brackets attached to the wings and projecting above the same, adjustable means for securing the brackets to the bars at selected elevations, furrow covering shares extending rearwardly beyond the wings, a rock shaft mounted upon the rear ends of the bars and carrying the shares and resilient means to turn the rock shaft in one direction.

3. A transplanting machine to be moved longitudinally of a hill, comprising a frame, a pair of longitudinally extending bars arranged in spaced relation and secured to the frame, a scraping plate arranged beneath the bars and attached thereto and having its forward end extending upwardly and having a longitudinal slot, a furrow opener including a blade extending into the slot and provided at its rear end with spaced wings, brackets rigidly attached to the wings and projecting above the same, adjustable means for clamping the brackets to the bars at selected elevations, furrow covering shares disposed rearwardly of the wings, a rock shaft mounted upon the rear ends of the bars, cranks mounted upon the rock shaft to turn therewith and secured to the forward ends of the covering shares, a crank connected with the rock shaft to turn it, and a spring to move the last named crank in one direction.

WILLIE K. CHERRY.

REFERENCES CITED

The following references are of record in the file of this patent:

UNITED STATES PATENTS

| Number | Name | Date |
| --- | --- | --- |
| 398,754 | Stratton | Feb. 26, 1889 |
| 486,200 | Starks et al. | Nov. 15, 1892 |
| 511,814 | Starks et al. | Jan. 2, 1894 |
| 518,657 | Whitworth | Apr. 24, 1894 |
| 633,216 | Pretsman | Sept. 19, 1899 |

(Other references on following page)

UNITED STATES PATENTS

| Number | Name | Date |
|---|---|---|
| 915,546 | Briddell | Mar. 16, 1909 |
| 934,095 | Rhodes | Sept. 14, 1909 |
| 1,083,923 | Dillow | Jan. 13, 1914 |
| 1,504,140 | Poll | Aug. 5, 1924 |
| 1,651,851 | Synck | Dec. 6, 1927 |
| 1,723,073 | Poll | Aug. 6, 1929 |
| 1,807,474 | England | May 26, 1931 |
| 1,886,457 | Winkley | Nov. 8, 1932 |
| 1,996,686 | Poll | Apr. 2, 1935 |
| 2,334,598 | Bateman et al. | Nov. 16, 1943 |

FOREIGN PATENTS

| Number | Country | Date |
|---|---|---|
| 259,567 | Italy | July 11, 1928 |